US009565401B1

(12) United States Patent
Graybill et al.

(10) Patent No.: US 9,565,401 B1
(45) Date of Patent: Feb. 7, 2017

(54) INTELLIGENT VIDEO ARCHIVING

(71) Applicant: Amazon Technologies, Inc., Reno, NV (US)

(72) Inventors: Jules Cook Graybill, Seattle, WA (US); James Christopher Curlander, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 14/219,069

(22) Filed: Mar. 19, 2014

(51) Int. Cl.
| | |
|---|---|
| *H04N 19/40* | (2014.01) |
| *H04N 7/18* | (2006.01) |
| *H04N 19/625* | (2014.01) |
| *G06F 17/30* | (2006.01) |
| *G06F 17/00* | (2006.01) |

(52) U.S. Cl.
CPC .............. *H04N 7/181* (2013.01); *G06F 17/30* (2013.01); *G06F 17/60* (2013.01); *H04N 19/40* (2014.11); *H04N 19/625* (2014.11)

(58) Field of Classification Search
CPC .. G06Q 30/018; G06Q 40/02; G06Q 10/0637; G06Q 30/00; G06Q 10/10; G06Q 30/02; G06Q 40/08; G06Q 50/205; G06F 19/322; G06N 3/0454; G06N 3/084; G06N 3/086; H04N 19/40; H04N 19/46; H04N 19/48; H04N 19/61; H04N 19/625; H04N 19/70; H04N 19/96

USPC ......... 705/347, 35, 38, 39, 3, 317, 325, 326; 715/780, 713, 835; 348/159
See application file for complete search history.

(56) References Cited

U.S. PATENT DOCUMENTS

| | | | | |
|---|---|---|---|---|
| 2003/0160868 | A1* | 8/2003 | Kakou | G08B 13/19602 348/143 |
| 2006/0152636 | A1* | 7/2006 | Matsukawa | G08B 13/19667 348/715 |
| 2006/0203261 | A1* | 9/2006 | Kacker | G06F 17/30256 358/1.6 |
| 2009/0231466 | A1* | 9/2009 | Morgan | H04N 5/772 348/231.1 |

* cited by examiner

*Primary Examiner* — Behrooz Senfi
(74) *Attorney, Agent, or Firm* — Athorus, PLLC (57) ABSTRACT

Digital media files that are captured using one or more imaging devices and stored in one or more data stores may be compressed, modified or disposed of based on business value scores associated with such files. The business value scores may be generated on any available information that may be known or determined regarding the contents of such files, including records of activity occurring within a vicinity of the imaging devices, or data obtained through an analysis of such files. Moreover, the business value scores may be altered on any basis, including according to one or more functions, and the compression, modification or disposal of such files may be altered accordingly.

19 Claims, 8 Drawing Sheets

INTELLIGENT VIDEO ARCHIVING

BACKGROUND

Today, video cameras are frequently used for conducting surveillance or monitoring operations. For example, video cameras are commonplace in financial settings such as banks or casinos, where money changes hands in large amounts or at high rates of speed. Video cameras are also often used to monitor the arrival or departure of goods or services in warehouses, fulfillment centers or other like facilities, as well as the travels of persons or objects in locations such as airports, stadiums or other dense environments.

Video cameras may be aligned and configured to capture still or moving mages of actions or events within their respective fields of view, and information regarding the captured images or the actions or events may be recorded and subjected to further analysis in order to identify aspects, elements or features of the content expressed therein. When conducting surveillance or monitoring operations, video cameras may be provided alone or in groups, and programmed to recognize when an action or event has occurred, such as when a frame-to-frame analysis of video imagery suggests that a predetermined threshold has been exceeded or that a predetermined condition has been satisfied, or otherwise implies the occurrence of the action or the event based on information captured by the cameras. Moreover, information and data captured by such cameras may be archived in one or more data stores, where the information or data may be used or recalled for any purpose.

Unlike their film-based ancestors, digital cameras may capture still or moving images in the form of digital computer-based files that may be stored in one or more hard drives, servers or other non-transitory computer-readable media. While digitally stored files may be indexed, accessed or backed up with relative ease, where a large number of cameras are provided in order to monitor various aspects of a location or facility, the amount of digital storage capacity that is required in order to preserve such files for any relevant purpose may be overwhelming. For example, where a facility such as a warehouse or an airport provides a large array of digital cameras for surveillance or monitoring operations, such cameras may capture and store over a petabyte (or a million gigabytes) of video data from such cameras each day.

Moreover, existing systems and methods for archiving digital media files typically merely cause one or more digital media files to be deleted after a predetermined time, or when a capacity level of one or more data stores reaches a predetermined threshold or percentage. Such systems and methods merely treat all media files that are captured from a single imaging device, and every portion of such media files, as having equal value, despite the fact that no two digital media files are created equal from an archiving perspective.

DETAILED DESCRIPTION

As is set forth in greater detail below, the present disclosure is directed to systems and methods for intelligent video archiving. Specifically, the systems and methods are directed to the storage, modification, retention and/or disposition of digital media files, which may be of any length, size or level of resolution, based on one or more quantifiable or qualitative metrics, such as business value scores. Where one or more imaging devices, e.g., digital cameras, are aligned or configured to capture information or data regarding events, occurrences or activities in a predefined area or within a monitored facility, the systems and methods disclosed herein may determine a business value or priority level for such files or portions thereof which include such information or data. The business values or priority levels of such files may be determined according to any circumstances that may be associated with such events, occurrences or activities, or the recording thereof, as well as one or more functions or policies for modifying the business value or priority level. Such functions or policies may determine the manner in which such files or portions thereof are stored, modified, retained and/or disposed of. For example, the digital media files may be preserved, compressed, transferred to an external location or deleted, depending on the business value or priority level with respect to one or more thresholds or conditions.

Figure 1:
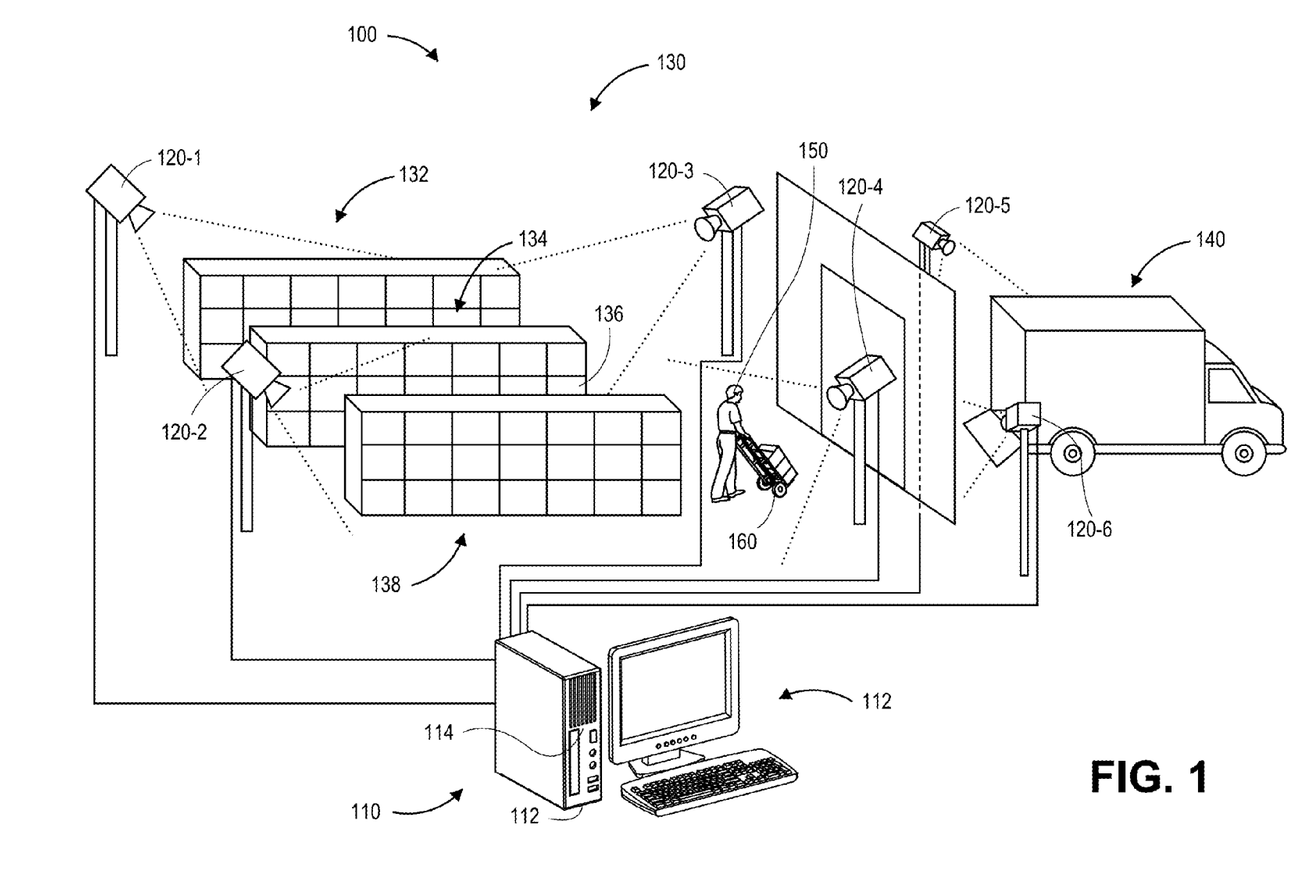
FIG. 1 is a view of components of one system for intelligent video archiving, in accordance with embodiments of the present disclosure.

For example, the business value of a digital media file may be defined for an individual camera, or for a group of cameras, based on events, occurrences or activities within the fields of view of the respective cameras, which may be identified by resort to extrinsic records or sources, or by an analysis of the information or data captured by such cameras. Referring to FIG. 1, a system 100 including a video management system 110 and an array of cameras 120-1, 120-2, 120-3, 120-4, 120-5, 120-6 within a fulfillment center 130 is shown. The video management system 110 includes a server 112 and one or more databases 114 associated with a computer system 116. The cameras 120-1, 120-2, 120-3, 120-4, 120-5, 120-6 are aligned to capture still or moving images of various aspects of the fulfillment center 130. For example, the cameras 120-1, 120-2, 120-3, 120-4 are configured to capture information or data regarding activity occurring within aisles 132, 134, 136, 138, such as the delivery or retrieval of materials 160 by a worker 150, while the cameras 120-5, 120-6 are configured to capture information or data regarding activity occurring outside the fulfillment center 130, such as an arrival or a departure of a delivery vehicle 140.

As is discussed above, the systems and methods of the present disclosure are directed to managing the storage, modification, retention and/or disposition of digital media files captured by one or more imaging devices, such as the cameras 120-1, 120-2, 120-3, 120-4, 120-5, 120-6, and stored in one or more data stores, such as within the one or more databases 114, according to business value scores calculated based at least in part on the content of such files, or the circumstances in which such files were captured. For example, where one or more of the cameras 120-1, 120-2, 120-3, 120-4, 120-5, 120-6 failed to record any relevant activity, e.g., where no deliveries or retrievals of items occurred within one or more of the aisles 132, 134, 136, 138, or where no arrivals or departures of vehicles occurred outside the fulfillment center 130, a digital media file captured from such cameras may be assigned a low business value score. However, where one or more of such cameras recorded relevant activity in the form of deliveries or retrievals of items, or vehicle arrivals or departures, or where an unresolved incident (e.g., a damaged or missing item) is determined to have occurred within the fields of view of such cameras, a digital media file captured from such cameras may be assigned a high business value score.

Moreover, the digital media files may be stored, modified, retained or otherwise disposed according to their respective business value scores. For example, digital media files having business value scores above a first threshold may be maintained in their maximum available resolution, size or pixel density. Digital media files having business value scores below the first threshold, e.g., between the first threshold and a second threshold, or between the second threshold and a third threshold, may be compressed according to their respective business value scores by any means, such as by reducing the level of resolution, shrinking the size, decreasing the pixel density or deleting redundant frames of such files. When the business value score of the digital media file reaches a predetermined or final threshold, the digital media file may be deleted or transferred to one or more external locations for storage.

Furthermore, the business value score associated with a digital media file may be automatically or manually adjusted over time, according to one or more functions or factors. In particular, the systems and methods of the present disclosure may be programmed to determine an initial business value score associated with a digital media file based on any factor, and to degrade or reduce the business value score according to a function over time. For example, such systems and methods may assign initial business value scores to each digital media file (e.g., a score of 100 or another nominal value), and automatically reduce the business value score over time in the absence of human interaction, or permit a manual alteration (e.g., an increase or a decrease) to the business value score to be entered. Thus, according to the systems and methods of the present disclosure, when a business value score rises above a relevant threshold, or falls below the threshold, a change in the status of the associated digital media file may be affected accordingly. In this regard, the digital media file may be preserved, compressed, transferred to an external location or deleted, based on the value of the business value score.

The functions or processes by which a business value score may be modified may be defined based at least in part on any relevant factor. Those of ordinary skill in the pertinent arts will recognize that decisions regarding the capture, processing and storage of digital media files (e.g., video files) are typically driven by available processing power, storage capacity within one or more local or off-site storage facilities, as well as bandwidth for transferring such digital media files to one or more off-site storage facilities. For example, a function may be driven by an estimated or actual storage capacity in at least one local or remote data store, as well as estimated or actual economic, computational or other costs of compressing digital media files by a predetermined extent, transferring digital media files to a media storage facility, or deleting digital media files from one or more data stores. The systems and methods of the present disclosure may aid in the efficient scheduling or allocation of such processing power, storage capacity or bandwidth, or any other constraints or limitations, by assigning business value scores to digital media files, and basing decisions regarding the capture, processing and storage of such digital media files on such business value scores.

Imaging devices such as digital video cameras are frequently provided for the purpose of capturing digital information and data regarding events, occurrences or activities with their respective fields of view. Such cameras may be mounted in strategic locations and configured to record such information and data at any given time. For example, a convenience store or gas station may provide one or more cameras for monitoring the presence of personnel in a vicinity thereof. A bank or other financial institution may mount one or more cameras near doors or other entryways, around safes or vaults, or within automated teller machines, in order to identify patrons who were making deposits or withdrawals, or executing other transactions. An airport, train station or other transportation facility typically will install an array of cameras in strategic locations for capturing information and data regarding passengers, luggage, vehicles and any potentially suspicious or hazardous activity.

When imaging devices are utilized in surveillance or monitoring operations, a single imaging device may be provided, or one or more imaging devices may be provided in a matrix, array or other strategic configuration. For example, where the video monitoring of an object or area of interest is desired, a single imaging device may be placed in a location and an orientation in which the object or area of interest remains in the imaging device's field of view, or may be reasonably accessed by the imaging device and placed within the imaging device's field of view. Alternatively, a plurality of imaging devices may be placed in locations and orientations in which various aspects of the object or the area of interest may be captured. Such imaging devices may be functionally identical, or may include one or more different unique sets of attributes or operational capacities.

Information or data captured by imaging devices that are provided in surveillance or monitoring operations may be stored in one or more data stores for various periods of time and for various reasons. For example, where a fistfight or other disagreement among workers is reported several days after the fact, footage of the disagreement that was captured from one or more imaging devices may be subsequently reviewed in order to determine an underlying cause thereof. Where a package that was prepared and delivered from a fulfillment center arrives at a destination in a damaged condition, footage of the preparation and delivery of the package may be subsequently reviewed in order to determine whether the damage occurred within the fulfillment center. Where a break-in or other security breach is determined to have occurred in a secure location, footage of the location may be evaluated in order to identify one or more persons responsible for the breach.

Frequently, however, the value or importance of digital media files captured using an imaging device may be determined or known shortly after the information or data was obtained and stored. For example, workplace incidents are typically reported within a finite number of days, or not at all. Similarly, complaints or objections regarding conditions of delivered goods or services are usually reported within a predetermined timeframe, e.g., a warranty or guarantee period associated with the goods or services. Likewise, a break-in or other security breach is usually noticed or acknowledged within a short timespan, such as a morning following an overnight incident, or during a routine security round.

Therefore, some digital media files relating to such incidents, deliveries or breaches may hold their value for extended periods of time well after the files were captured. Meanwhile, other digital media files that do not include information or data regarding such incidents, deliveries or breaches, or other relevant activities, may have a lower value, or a value that declines rapidly, shortly after such files were captured and stored. However, current systems and methods for file storage and retention typically store files within one or more data stores for fixed periods of time, or automatically delete the files after such periods of time, based on the available storage capacity within the one or more data stores.

The systems and methods of the present disclosure are directed to intelligently archiving one or more digital media files based on their respective business values, which may be determined according to a business value score or other metric that may be derived and customized for each file or portions thereof. The digital media files that may be archived in accordance with the present disclosure may be of any length or duration, size, level of resolution or pixel density. Such digital media files which include information or data or high relevance or importance may be assigned high business value scores, and preserved accordingly, while such digital media files that are determined to not contain any information or data of relevance may be compressed or deleted according to an accelerated schedule. The business value scores may be automatically or manually determined based on not only the contents of such digital media files, which may be manually or automatically identified therefrom, but also extrinsic data that may be known regarding the contents of the digital media files, or the events, occurrences or activities which occurred within a field of view of one or more of a plurality of imaging devices when the digital media files were captured, e.g., an extrinsic index or record of information or data regarding such events, occurrences or activities.

For example, according to one embodiment, an array or matrix of imaging devices, such as digital video cameras, may be provided in a warehouse or fulfillment center environment in order to monitor the inbound receipt of items from various merchants, vendors, sellers, distributors or manufacturers, and the outbound distribution of such items to customers or other destinations. Concurrently, various computer-based logs associated with the receipt or distribution of such items may be captured, i.e., by recording entries into one or more computer systems, or by acknowledging the scanning or reading of identifiers such as bar codes on external surfaces of one or more items. By correlating the locations and times at which such events occurred (e.g., locations within the fulfillment center where items were placed on shelves or in bins, retrieved from such shelves and bins, placed into one or more containers or loaded onto one or more delivery vehicles) with the locations of the various imaging devices within the warehouse or fulfillment center, a list or record of imaging devices which likely recorded relevant activity, and which likely did not record any relevant activity, may be determined along with the corresponding digital media files captured by such imaging devices. The digital media files which are determined to not contain any relevant information or data may be assigned a relatively low business value score, while the digital media files which are determined to contain relevant information or data may be assigned business value scores according to the relative value of such information or data.

Moreover, the business value scores may be manually or automatically modified according to one or more functions or policies. For example, a default initial business value score may be assigned to each digital media file captured by an imaging device, and the business value scores may be degraded or adjusted according to a standard function over time, e.g., the business value score may be reduced by a fixed amount per hour, per day, per week or per any other nominal unit of time. Alternatively, the business value score may be fixed or increased when an unresolved matter or significant issue is identified within the corresponding digital media file by manual or automatic means, and the business value score may be decreased, or permitted to decrease, once the matter or issue is resolved. Likewise, where a value of a given digital media file is conclusively determined, the business value score of the digital media file may be defined accordingly. Any type of function or policy may be defined with regard to the business value scores of one or more digital media files, such as functions or policies which consider estimated or actual storage capacities in at least one local or remote data store, as well as estimated or actual economic, computational or other costs of compressing, transferring or deleting digital media files from one or more data stores, and the business value scores may be modified or adjusted accordingly.

By generating business value scores for digital media files, or portions thereof, a format or condition in which such digital media files are to be stored may be determined, thereby enabling the creation of discrete, customized retention policies for each and every digital media file on a clip-by-clip basis. In this regard, individual digital media files may be downgraded in quality, deleted or otherwise disposed according to a probability that their content may be ultimately deemed valuable, or where storage capacity within the one or more data stores in which such files are stored becomes limited. For example, a digital media file assigned a given business value score may be maintained in one or more data stores in its original format. As the probability that the digital media file may be deemed valuable decreases, the business value score may be reduced, and the digital media file may be compressed according to one or more standard means (e.g., "lossy compression," "lossless compression," or like data encoding processes which result in a reduction in the size, resolution or pixel density of the digital media files), until the digital media file may be deleted, transferred to another data store or disposed in any other manner.

A business value score may represent the potential value of a digital media file or any portions thereof for general or specific purposes, and may be calculated in any manner. For example, an initial business value score may be calculated or assigned by determining whether a digital media file contains information or data regarding any particularly noteworthy events, such as an inbound arrival of a targeted parcel or delivery vehicle, or an accident or adverse condition in a specific location, and weighted accordingly. The initial business value score may be maintained at a substantially high level for a finite period of time, which would permit the evaluation of various events that may have occurred within a field of view of a particular imaging device, and may therefore be present within a digital media file captured by such a device. Conversely, an initial business value score may be calculated or assigned by determining whether a digital media file lacks any information regarding any particularly noteworthy events. For example, a digital media file captured by an imaging device associated with a particular aisle of a fulfillment center where no activity occurred may be deemed to lack any business value ab initio, and assigned a substantially low business value score accordingly.

According to some embodiments of the present disclosure, each digital media file captured by an array of imaging devices may be assigned a predetermined business value score, which may be periodically and automatically downgraded over time. As its business value score falls below one or more thresholds, a digital media file may be automatically compressed or otherwise reduced in size until the business value score reaches a final value, at which point the digital media file is disposed of in a predetermined manner. If the digital media file is determined to have value, or a reason for maintaining the digital media file in an original or current state arises (e.g., an unresolved event is identified as having been captured in the digital media file), the automatic downgrading may be slowed or halted by a manual action, and resumed only when the digital media file is no longer deemed to be specifically valuable. However, if the digital media file is conclusively determined to have a defined value, the business value score may be permanently set at a particular value and disposed of accordingly. Finally, where a capacity within one or more data stores in which digital media files are maintained is challenged, the digital media files having the lowest business value scores may be further compressed, transferred or otherwise disposed of in order to free up adequate capacity for other such files. Conversely, where the capacity of the one or more data stores is not challenged, there may be no need to compress, transfer or dispose of any digital media files, regardless of their business value scores.

The rate at which a business value score is degraded may be determined on any basis. For example, the business value score calculations disclosed herein may be provided in real time, or in near-real time, with regard to the ongoing operation of a plurality of imaging devices based on any available information that may be known regarding the events, occurrences or activities which may have been recorded within their respective fields of view. Alternatively, such calculations may be performed forensically, i.e., in retrospect, or after the fact, with regard to the operation of the plurality of imaging devices, and may be used to determine the business value scores of digital media files captured thereby as information regarding the contents of such files is determined.

Figure 2:
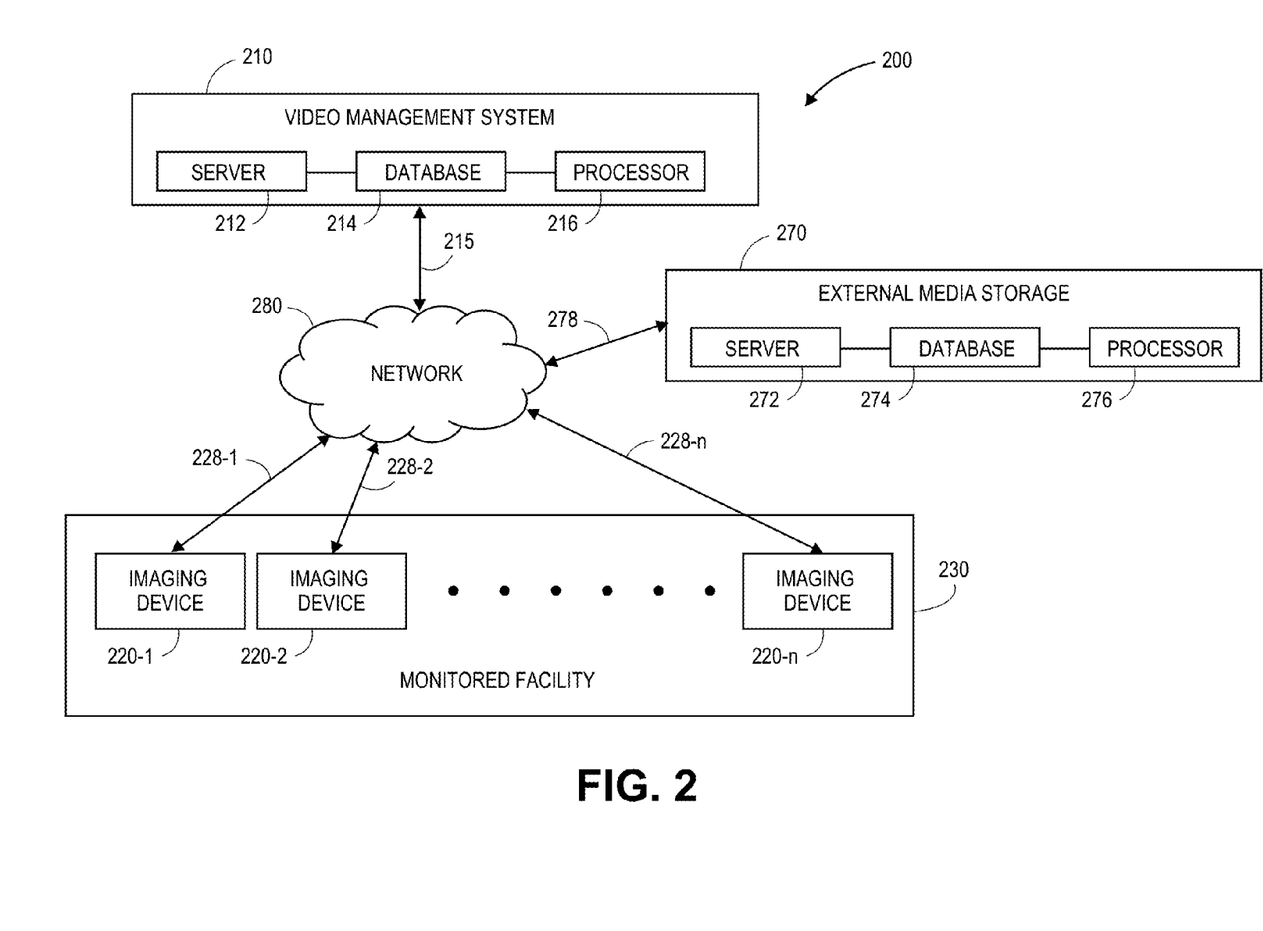
FIG. 2 is a block diagram of components of one system for intelligent video archiving, in accordance with embodiments of the present disclosure.

Referring to FIG. 2, a block diagram of one system 200 for intelligent video archiving in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in the system 100 of FIG. 1.

The system 200 of FIG. 2 includes a video management system 210, a monitored facility 230 having a plurality of n imaging devices 220-1, 220-2 . . . 220-n therein and an external media storage facility 270 connected to one another across a network 280. The video management system 210 of FIG. 2 includes one or more physical computer servers 212 having a plurality of databases 214 associated therewith, as well as one or more computer processors 216. The servers 212 may be connected to or otherwise communicate with the databases 214 and the processors 216. The databases 214 may store any type of information or data, including digital media files or any like files containing multimedia (e.g., audio and/or video content), for any purpose. The servers 212 and/or the computer processors 216 may also connect to or otherwise communicate with the network 280, as indicated by line 218, through the sending and receiving of digital data.

The monitored facility 230 may be any facility, station or location for which a plurality of imaging devices 220-1 through 220-n may be installed and provided for performing monitoring and/or surveillance activities within the monitored facility 230. According to one embodiment, the monitored facility 230 may be a fulfillment center, a warehouse or other like facility. According to another embodiment, the monitored facility 230 may be a financial institution, such as a bank or trading floor. According to yet another embodiment, the monitored facility 230 may be a transportation hub or station, such as an airport, a train station or a bus station. According to still other embodiments, the monitored facility may be a stadium, a theater, a shopping center or another large-scale venue. Those of ordinary skill in the pertinent art will recognize that the systems and methods of the present disclosure are not limited by any activities that may be performed or functions that may be provided by the monitored facility 230.

The imaging devices 220-1 through 220-n may comprise any form of optical recording sensor or device that may be used to photograph or otherwise record information or data regarding activities occurring within one or more areas or regions of the monitored facility 230, or for any other purpose. Such imaging devices 220-1 through 220-n may capture one or more still or moving images, as well as any relevant audio signals or other information, within one or more designated locations within the monitored facility 230, and may also connect to or otherwise communicate with the network 280, as indicated by lines 228-1, 228-2 . . . 228-n, through the sending and receiving of digital data. As is shown in FIG. 2, the monitored facility 230 includes n imaging devices 220-1, 220-2 . . . 220-n therein, although any number or type of imaging devices or sensors may be provided within a monitored facility 230 in accordance with the present disclosure.

For example, the imaging devices 220-1 through 220-n may be digital cameras which operate by capturing light that is reflected from objects, by calculating or assigning one or more quantitative values to aspects of the reflected light, e.g., pixels, and by generating an output based on such values, or by storing such values in one or more data stores. Such cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores, as well as one or more removable data stores, one or more remote data stores (e.g., networked data stores), or otherwise displayed on one or more broadcast or closed-circuit television networks. For example, as is shown in FIG. 2, digital media files captured by the imaging devices 220-1, 220-2 . . . 220-n may be transferred to the databases 214 by way of the network 280. Data files that are stored in one or more data stores may be subsequently presented on one or more computer displays, or subjected to one or more analyses, such as to identify items expressed therein.

Reflected light may be captured or detected by a digital camera if the reflected light is within the camera's field of view, i.e., a function of a distance between a sensor and a lens, known as a focal length, within the camera, as well as a location of the camera and an angular orientation of the camera's lens. Where an object appears within a depth of field, or a distance within the field of view where the clarity and focus is sufficiently sharp, a digital camera may capture light that is reflected off objects of any kind to a sufficiently high degree of resolution using one or more sensors thereof, and store information regarding the reflected light in one or more data files.

The imaging devices 220-1, 220-2 . . . 220-n of FIG. 2 may further include manual or automatic features for modifying their respective fields of view or orientations. For example, a digital camera may be configured in a fixed position, or with a fixed focal length (e.g., fixed-focus lenses) or angular orientation. Alternatively, the imaging devices 220-1, 220-2 . . . 220-n may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Furthermore, the imaging devices 220-1, 220-2 . . . 220-n of FIG. 2 may also digitally or electronically adjust a still or moving image identified in a field of view of an imaging device, subject to the physical and operational constraints of the imaging devices. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in a digital media file, including colors, textures or outlines of the objects, may be extracted from the file in any number of ways. For example, colors of pixels, or of groups of pixels, in a digital media file may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital media file may be identified using one or more computer-based methods, such as by identifying changes in intensities within regions or sectors of the digital media file, or by defining areas of a digital media file corresponding to specific surfaces. Furthermore, outlines of objects expressed in a digital media file may be identified using one or more algorithms or machine-learning tools. Some such algorithms or tools may recognize edges, contours or outlines of objects in a digital media file, or of portions of objects in the digital media file, and may match the edges, contours or outlines of the objects against information regarding edges, contours or outlines of known objects, which may be stored in one or more data stores.

The external media storage facility 270 may be any facility, station or location having the ability or capacity to receive and store information or data, such as digital media files, in one or more data stores, e.g., digital media files received from the video management system 210, one or more of the imaging devices 220-1, 220-2 . . . 220-n or the monitored facility 230. As is shown in FIG. 2, the external media storage facility 270 includes one or more physical computer servers 272 having a plurality of databases 274 associated therewith, as well as one or more computer processors 276. The servers 272 may be connected to or otherwise communicate with the databases 274 and the processors 276. The databases 274 may store any type of information or data, including digital media files or any like files containing multimedia (e.g., audio and/or video content), for any purpose. The servers 272 and/or the computer processors 276 may also connect to or otherwise communicate with the network 280, as indicated by line 278, through the sending and receiving of digital data.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "video management system," a "imaging device" or a "monitored facility," or their associated components, may be automated steps performed by their respective computer systems, or implemented within software modules (or computer programs) executed by one or more general purpose computers. Moreover, process steps described as being performed by a "video management system," a "imaging device" or a "monitored facility," or their associated components, may be typically performed by a human operator, but could, alternatively, be performed by an automated agent. Moreover, those of ordinary skill in the pertinent arts will further understand that process steps described herein as being performed using an "imaging device" may be performed using any form of imaging device, including but not limited to a digital camera, or any type of related imaging sensor.

The video management system 210, the imaging devices 220-1, 220-2 . . . 220-n or the monitored facility 230 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the imaging devices 220-1, 220-2 . . . 220-n may be adapted to transmit information or data in the form of synchronous or asynchronous messages to the video management system 210 or another computer device in real time or in near-real time, or in one or more offline processes, via the network 280. Those of ordinary skill in the pertinent art would recognize that the video management system 210 or the monitored facility 230 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers, such as those associated with the video management system 210, the imaging devices 220-1, 220-2 . . . 220-n or the monitored facility 230, or any computers or control systems utilized thereby and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
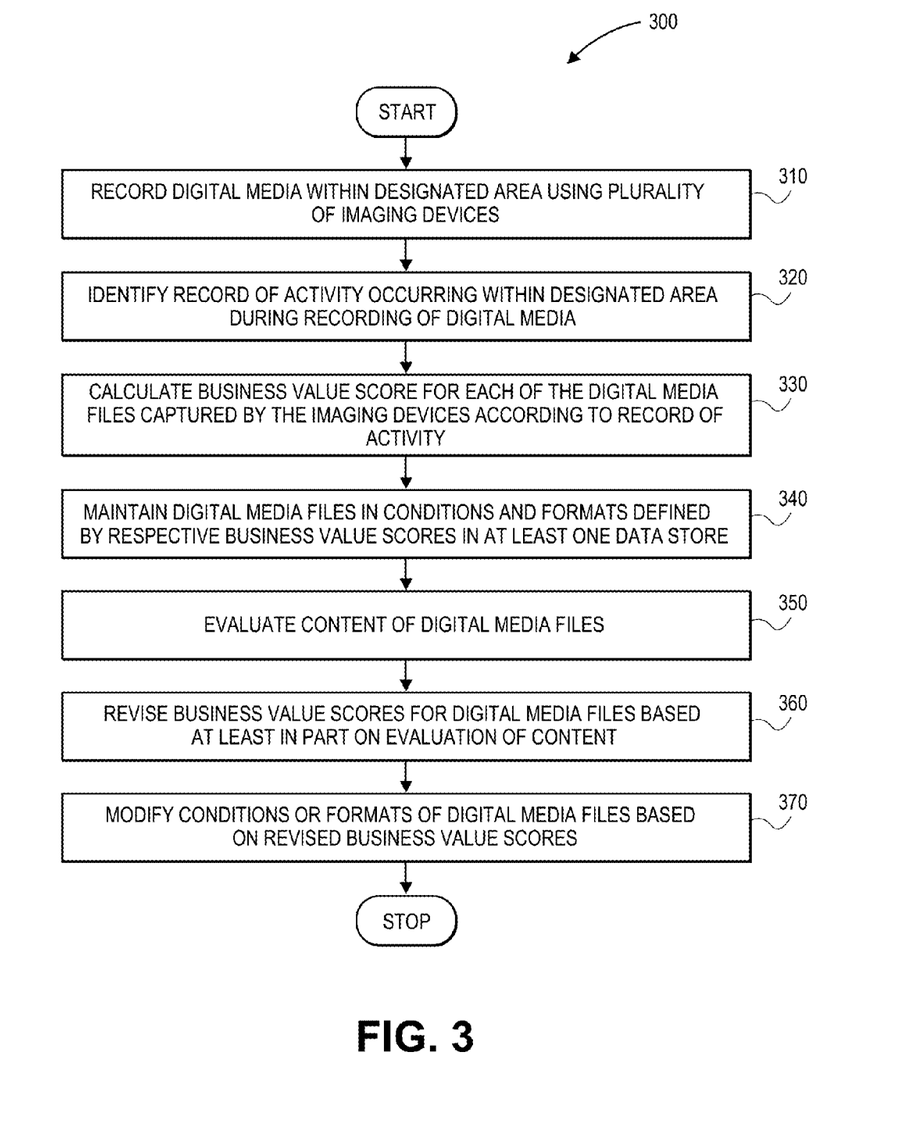
FIG. 3 is a flow chart of one process for intelligent video archiving, in accordance with embodiments of the present disclosure.

As is discussed above, the systems and methods of the present disclosure are directed to intelligently archiving video files of any duration, size or level of resolution, based at least in part on business value scores associated with such files. The business value scores may be calculated based on any information that may be available regarding the contents of the files, such as an extrinsic record of activity that may have been captured within such files, or an intrinsic analysis of the information expressed therein. Referring to FIG. 3, a flow chart 300 representing one embodiment of a process for intelligent video archiving in accordance with embodiments of the present disclosure is shown. At box 310, digital media is recorded within a designated area using a plurality of imaging devices. For example, referring again to FIG. 2, digital media may be captured using one or more of the imaging devices 220-1, 220-2 . . . 220-n and stored in the database 214.

At box 320, a record of activity occurring within the designated area during the recording of the digital media is identified. Referring again to FIG. 1, the record of activity may include any information (e.g., dates or times) regarding arrivals or departures of delivery vehicles 140 at the fulfillment center 130, as well as the placement of items into bins or onto shelves within the aisles 132, 134, 136, 138, the retrieval of such items, or the preparation of such items for delivery to customers within the fulfillment center 130. At box 330, a business value score is calculated for each of the digital media files captured by the imaging devices, based at least in part on the record of activity identified at box 320. For example, where the record of activity indicates that a digital media file may include information or data regarding one or more significant events, the business value score associated with the digital media file may be set at a relatively high level. Conversely, where the record of activity indicated that the digital media file does not include information or data regarding any significant events (e.g., where a field of view of an imaging device was devoid of data), the business value score associated with the digital media file may be set at a relatively low level.

At box 340, the digital media files are maintained in conditions and formats that are defined by their respective business value scores in at least one data store. For example, where a business value score indicates that a digital media file is of significant importance, the digital media file may be maintained in an original or enhanced condition with optimal resolution, size and pixel density. Where the business value score indicates that the digital media file may be of moderate importance, the digital media file may be compressed, as necessary, according to one or more algorithms or techniques. For example, the digital media file may be compressed using one or more video codecs which cause a size of the file to be compressed in exchange for a reduction in quality of the digital media file, with the extent of the compression and reduction defined based at least in part on the business value score corresponding to the digital media file. Alternatively, the digital media files may be maintained according to a priority ranking or schedule based on their respective business value scores, wherein the digital media files may be compressed, transferred or deleted according to the priority ranking or schedule in the event that the capacity of the at least one data store is limited.

At box 350, the content of the respective digital media files is evaluated. For example, a digital media file may be subjected to one or more analyses in order to identify any edges, contours or outlines within the digital media file and to recognize one or more objects based on such edges, contours or outlines. Alternatively, a human operator may view a digital media file, and determine information regarding the value of the content of the digital media file. At box 360, the business value scores for the digital media files are revised, where necessary, based on the evaluation of the content at box 350. For example, following the evaluation, where a digital media file is deemed to have a greater level of importance than was previously understood based on the record of activity identified at box 320, the business value score may be increased accordingly. Where the digital media file is deemed to have little value, however, the business value score may be decreased accordingly.

At box 370, the conditions or formats of the digital media files are modified based on the revised business value scores, and the process ends. For example, a digital media file may be compressed, transferred or deleted where the business value score of the digital media file is reduced, or the placement of the digital media file on a priority ranking or schedule for deleting digital media files in the event of a capacity shortage may be adjusted in a manner consistent with the business value score.

Figure 4A:
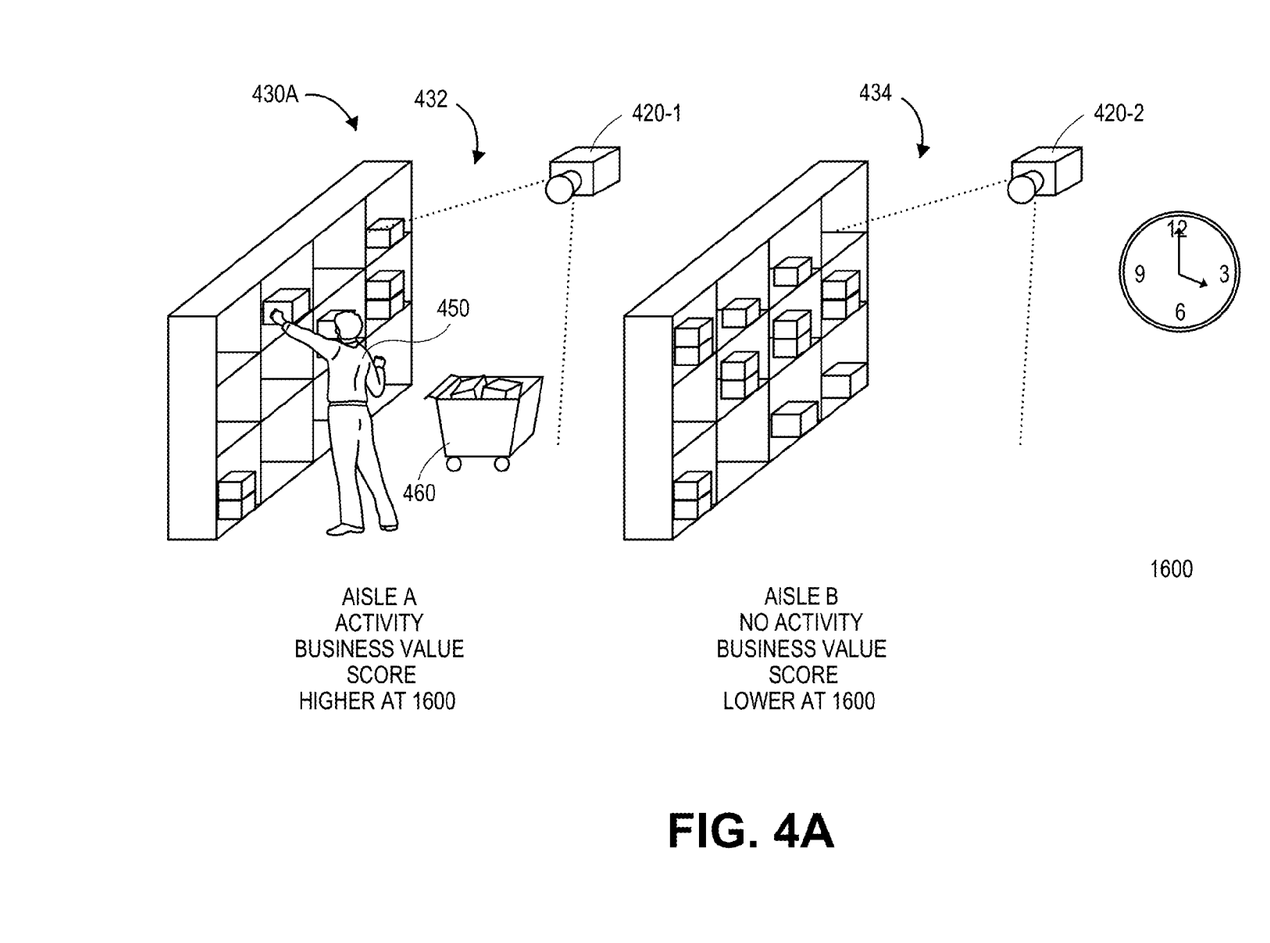
FIGS. 4A and 4B are views of components of systems for intelligent video archiving, in accordance with embodiments of the present disclosure.

As is discussed above, and as is shown in FIGS. 4A and 4B, business value scores may be assigned to digital media files or portions thereof on any basis, and may vary for each digital media file or portion. For example, different business value scores may be assigned to digital media files or portions thereof that are captured concurrently from different imaging devices. Referring to FIG. 4A, a system 400A including cameras 420-1, 420-2 that are operating concurrently at a given time, viz., 4 o'clock p.m., within a fulfillment center 430A is shown. Except where otherwise noted, reference numerals preceded by the number "4" shown in the systems 400A, 400B of FIG. 4A or FIG. 4B indicate components or features that are similar to components or features having reference numerals preceded by the number "1" shown in the system 100 of FIG. 1.

As is shown in FIG. 4A, the cameras 420-1, 420-2 are configured to capture information or data regarding events, occurrences or activities within aisles 432, 434, respectively. Additionally, as is shown in FIG. 4A, a worker 450 is placing items onto shelves or into bins within the aisle 432 from a cart 460, while the aisle 434 is dormant.

According to the systems and methods of the present disclosure, digital media files captured from the camera 420-1 regarding the events, occurrences or activities within aisle 432 at the given time indicated in FIG. 4A may be generally assigned a higher business value score than digital media files captured from the camera 420-2 regarding any events, occurrences or activities within aisle 432 at the given time. The fact that the worker 450 operated within the aisle 432 with the cart 460 in view of the camera 420-1, and the fact that nothing occurred in view of the camera 420-2, may be determined by any means. For example, the business value score may be based on information or data maintained in one or more extrinsic records, e.g., an electronic ledger or other registry of the receipt or distribution of items within the fulfillment center 430, which may indicate whether items were placed into storage in the aisles 432, 434 or retrieved therefrom. Additionally, the digital media files may be automatically evaluated according to one or more feature recognition systems or algorithms to recognize any edges, contours or outlines of objects in the respective digital media files, or any motion of such objects therein. Alternatively, may be independently viewed by one or more human operators.

Figure 4B:
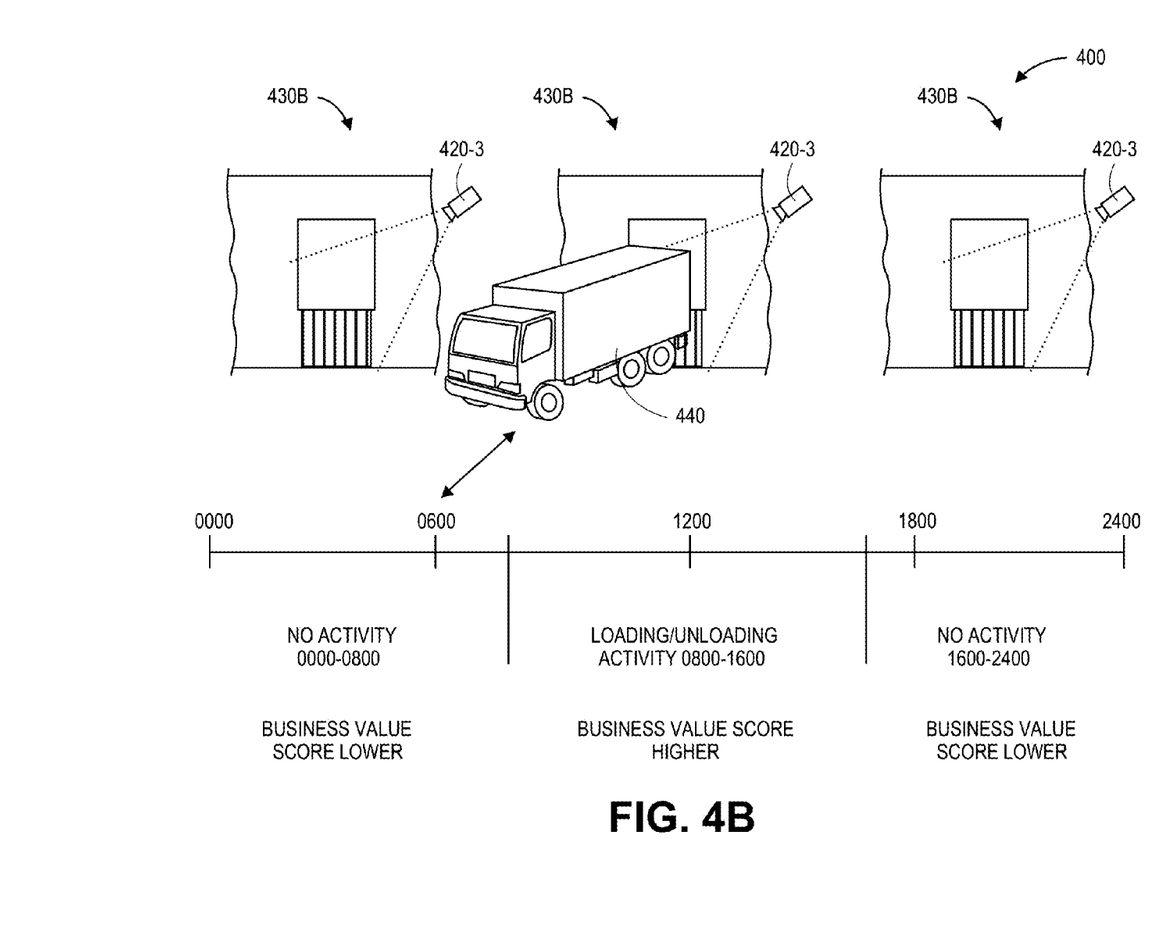

Additionally, different business value scores may be assigned to digital media files or portions thereof that are captured from the same imaging device at different times. Referring to FIG. 4B, a system 400B including a camera 420-3 that is mounted outside a fulfillment center 430B loading dock is shown. The camera 420-3 is configured to capture information or data regarding events, occurrences or activities outside the fulfillment center 430B, such as the arrival or departure of one or more delivery vehicles 440. As is shown in FIG. 4B, between the hours of midnight and 8 o'clock a.m., and between the hours of 4 o'clock p.m. and midnight, no activity is observed outside of the fulfillment center. However, between the hours of 8 o'clock a.m. and 4 o'clock p.m., one or more delivery vehicles 440 is shown as having arrived at or departed from the fulfillment center 430B.

Accordingly, the portions of digital media files captured from the camera 420-3 between the hours of 8 o'clock a.m. and 4 o'clock p.m. as shown in FIG. 4B may be generally assigned higher business value scores than the portions of the digital media files captured from the camera 420-3 between the hours of midnight and 8 o'clock a.m., and the hours of 4 o'clock p.m. and midnight. As with the system 400A of FIG. 4A, the events, occurrences or activities at such times may be determined by resort to one or more extrinsic records, or through a manual or automatic analysis of the digital media files or portions thereof captured by the camera 420-3 at such times.

Figure 5:
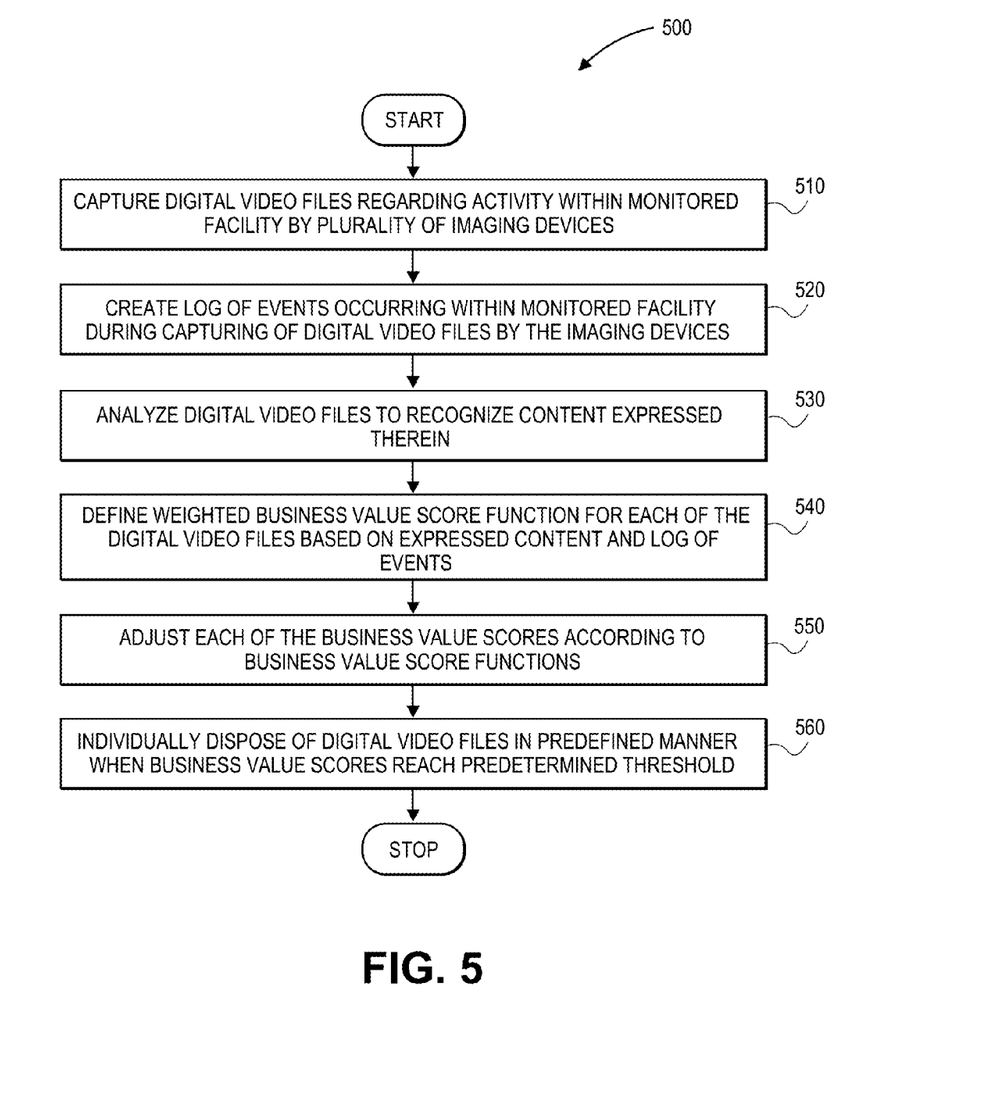
FIG. 5 is a flow chart of one process for intelligent video archiving, in accordance with embodiments of the present disclosure.

As is also discussed above, a business value score may be defined, modified or established on any basis, such as in accordance with one or more functions or policies that may be defined independently with regard to digital media files captured by each imaging device and at any given time. According to one such embodiment, a business value score may be established based at least in part on any available processing power, storage capacity within one or more local or off-site storage facilities, or bandwidth for transferring such digital media files to one or more off-site storage facilities, and automatically decreased in value according to one or more such functions or policies. Referring to FIG. 5, a flow chart 500 representing one embodiment of a process for intelligent video archiving in accordance with embodiments of the present disclosure is shown. At box 510, digital video files are captured regarding activity within a monitored facility by a plurality of imaging devices. Such imaging devices may be provided in a defined array or matrix, or mounted at one or more strategic locations at the monitored facility.

At box 520, a log of events occurring within the monitored facility occurring within the monitored facility during the capturing of the digital video files by such imaging devices is created. For example, where the monitored facility is a bank, a record of the transactions occurring within the bank over a period of time is created. Where the monitored facility is a casino, a record of chip conversions, playing card exchanges, employee shift transfers or significant winnings may be generated. Where the monitored facility is a military installation, the arrivals or departures of personally owned vehicles, as well as vessels, equipment, ordinance or supplies may be generated. At box 530, the digital video files captured at box 510 are analyzed in order to recognize the content expressed therein. For example, the digital video files may be automatically evaluated according to one or more algorithms or processes, or individually viewed by one or more human operators. Moreover, such analyses may be performed at any given time, i.e., in real time, or in near-real time, with regard to the capturing of the digital video files.

At box 540, a weighted business value score function is defined for each of the digital video files based on the log of events and the analyses of the content expressed therein. Based on information or data regarding what may be included in the digital video files, including events that occurred within a vicinity of each of the imaging devices, or the content of such files, a function by which a business value score is calculated for each of the digital video files may be defined. Such functions may be weighted or otherwise defined to favor or emphasize one or more actions or types of actions, or to disfavor or deemphasize other actions or types of actions. At box 550, each of the business value scores may be adjusted according to the respectively defined functions. For example, once the business value scores have been established, the functions may cause such scores to increase or decrease on any basis.

At box 560, the digital video files may be individually disposed of in predefined manners when the business value scores reach predetermined thresholds. Where a function defined with regard to a digital video file causes a business value score to degrade over time, when the business value score falls below one or more thresholds, the digital video file may be compressed according to one or more algorithms or techniques (e.g., a "lossy compression," "lossless compression," or like data encoding processes). For example, where the business value score associated with a digital video file falls below a first threshold, the digital video file may be compressed from an original or pristine condition to a first level. When the business value score falls below a second threshold, the digital video file may be further compressed accordingly. When the business value score falls below a third or final threshold, the digital video file may be deleted or transferred to an external video storage facility, such as the external media storage facility 270 of FIG. 2, for storage or further processing. In this regard, where the business value score is modified in any manner or to any extent, the digital video file may be processed, handled or otherwise disposed of accordingly.

Figure 6A:
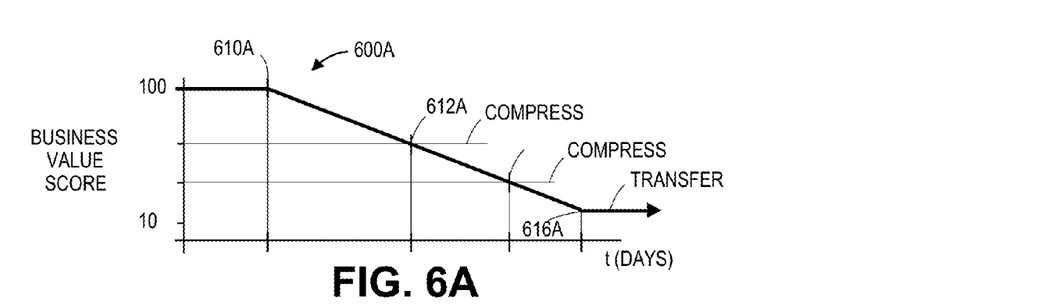
FIGS. 6A, 6B, 6C and 6D are plots of business value score data associated with systems and methods for intelligent video archiving, in accordance with embodiments of the present disclosure.

The various events that may be associated with the processing, handling or disposal of a digital media file based on a business value score are shown in FIGS. 6A, 6B, 6C and 6D. Referring to FIG. 6A, a plot 600A of a business value score over time is shown. The plot 600A indicates that an initial business value score is determined, and remains constant until time 610A, when the business value score begins to decrease linearly over time. At time 612A, when the business value score falls below a first threshold, the digital media file may be compressed to a first extent. At time 614A, when the business value score falls below a second threshold, the digital media file may be compressed to a second extent. At time 616A, when the business value score reaches a final threshold, the digital media file may be transferred to a media storage facility, e.g., to the external media storage facility 270 over the network 280, for permanent storage.

Figure 6B:
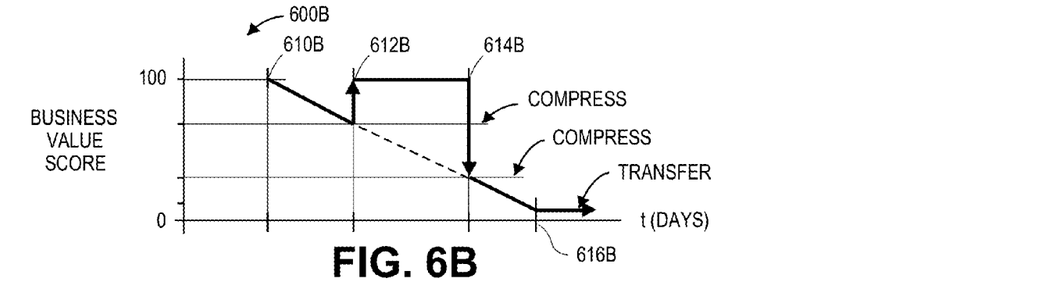

Additionally, as is also discussed above, the systems and methods of the present disclosure may further be manually or automatically adjusted based on the presence or absence of information or data regarding one or more issues therein. Referring to FIG. 6B, a plot 600B of a business value score over time is shown. As with the plot 600A of FIG. 6A, the plot indicates that an initial business value score is determined, and remains constant until time 600B, when the business value score begins to decrease linearly over time. At time 612B, however, a step increase in a value of the business value score may be provided for any reason or purpose, such as when the digital media file is determined to include information or data regarding an unresolved issue. For example, where a particular file is assumed or confirmed to include still or moving images associated with an incident such as a break-in, an arrival of a particular vehicle or person, or a failed delivery, the business value score may be manually or automatically increased in order to slow or halt the disposal of the file according to the business value score.

As is shown in FIG. 6B, the business value score may remain constant from time 612B to time 614B, when a resolution for the issue (e.g., a root cause, or a responsible or culpable party associated with the issue) may be identified, thereby inherently reducing the value of the digital media file. Therefore, as is shown in FIG. 6B, the business value score experiences a step decrease at the time 614B, when the business value score returns to a value defined according to the function at that time, or to any other score. At time 616B, when the business value score reaches a final threshold, the digital media file may be transferred to a media storage facility or otherwise designated for permanent storage.

Figure 6C:
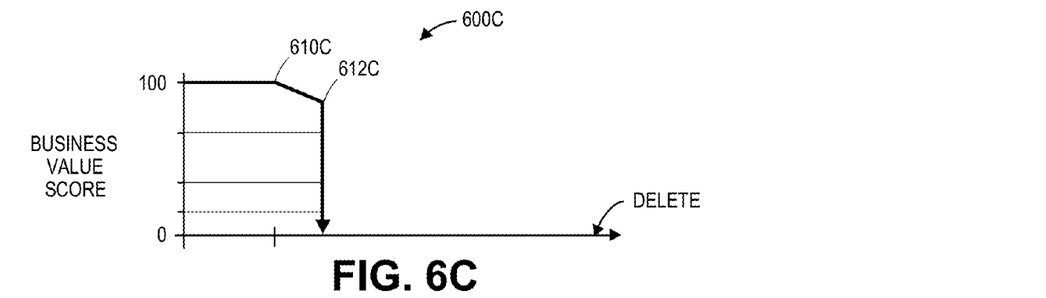

Additionally, when a digital media file is confirmed as being entirely without business value, the business value score may be modified accordingly, thereby causing the digital media file to be immediately transferred or deleted regardless of the business value score function. Referring to FIG. 6C, a plot 600C of a business value score over time is shown. The plot 600C shows the business value score as having an initial level until time 610C, when the business value score begins to decrease linearly over time. At time 612C, where the digital media file is determination to lack any substantive value, the business value score may be manually or automatically set at a minimum level, thereby causing the system to automatically delete the digital media file, or, alternatively, to compress the digital media file to a maximum extent.

Figure 6D:
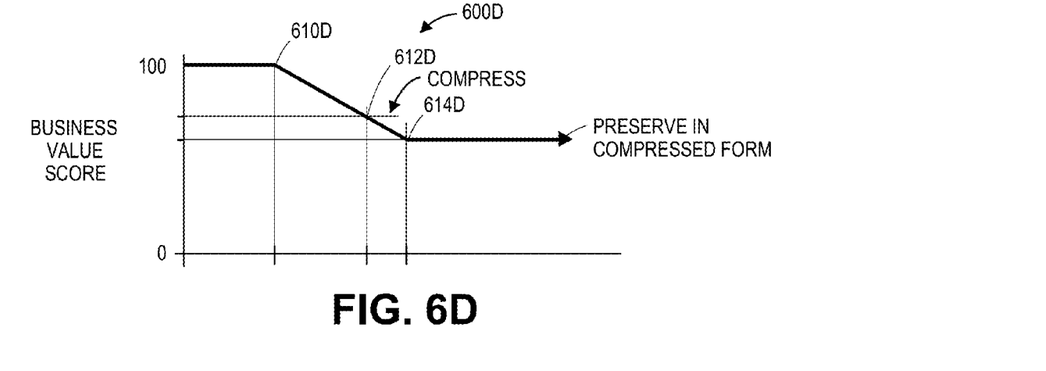

Finally, where a conclusive determination as to a business value of a digital media file is determined, the business value score may be set to a permanent level, and the digital media file may be disposed of accordingly. Referring to FIG. 6D, a plot 600D of a business value score over time is shown. The plot 600D shows the business value score as having an initial level until time 610D, when the business value score begins to decrease linearly over time, passing below a first compression threshold at time 612D. At time 614D, however, the business value score is constant, thereby indicating that a business value of the digital media file has been conclusively determined, and that the digital media file will be permanently disposed of in accordance with the business value score. For example, as is shown in FIG. 6D, the constant business value score at time 614D and beyond indicates that the digital media file may be preserved in its form at that time, without further compression or expansion. Those of ordinary skill in the pertinent arts will recognize that the modification of the business value score according to a function or in any other manner may resume at any given time or on any basis, as well.

Accordingly, the systems and methods of the present disclosure may manage the level and extent of available space for maintaining one or more digital media files within one or more data stores by manually or automatically causing one or more of such files to be modified in format or condition according to a business value score, which may be set and adjusted according to one or more functions or policies. The effect of such modifications is shown with regard to the flow diagram 700 of FIG. 7, which depicts the events associated with the disposal of a digital media file based on a business value score, such as the plots 600A, 600B, 600C, 600D of FIGS. 6A-6D.

Figure 7:
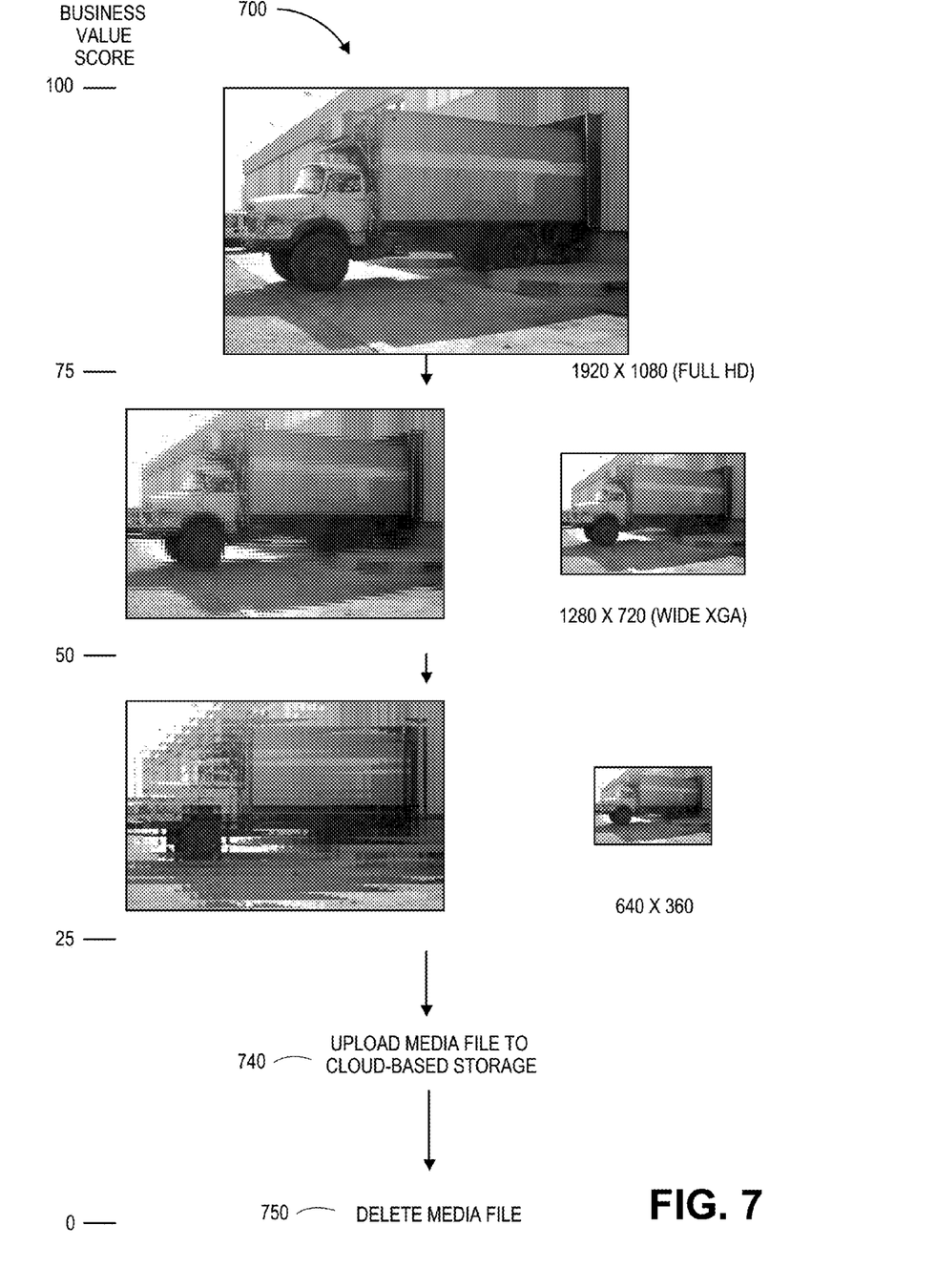
FIG. 7 is a flow diagram associated with intelligent video archiving in accordance with embodiments of the present disclosure.

Referring to FIG. 7, a flow diagram 710 associated with intelligent video archiving in accordance with embodiments of the present disclosure is shown. At 710, a representation of a portion of a digital media file associated with an arrival of a delivery vehicle at a loading dock is shown in its original format, condition and size, i.e., a 1920×1080 (full high definition, or "Full HD") level of resolution. The portion of the digital media file shown at 710 corresponds to a sufficiently high business value score, viz., between 75 and 100. At 720, a representation of the portion of the digital media file at 710 is shown following a first level of compression from the original format, condition and size to a lesser format, condition or size, i.e., a 1280×720 (wide extended graphics array, or "WXGA") level of resolution. The portion of the digital media file shown at 720 corresponds to a business value score that remains substantial, viz., between 50 and 75, but is not as high as the business value score corresponding to the portion of the digital media file shown at 710, and the difference between the resolution and quality of the portions shown respectively at 710 and 720 is apparent.

At 730, a representation of the portion of the digital media file shown at 710 is shown following a second level of compression from the format, condition or size of the portion shown at 720 to a lesser format, condition or size, i.e., a 640×360 level of resolution. The portion of the digital media file shown at 730 corresponds to a business value score that is not substantial, viz., between 25 and 50, and is shown in a lower resolution and quality than the portions shown at 710 or 720.

At 740, the portion of the digital media file in the format, condition or size of the portion of the digital media file shown at 730 may be uploaded to one or more cloud-based storage facilities, when the business value is sufficiently low, viz., below 25. For example, where the portion of the digital media file shown at 730 is sufficiently compressed or is no longer required, the digital media file may be transferred to another location. At 750, where the business value score is at a minimum, viz., 0, the digital media file may be deleted.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Additionally, although many of the embodiments described herein or shown in the accompanying figures refer to the archiving of digital media in the form of video files, the systems and methods of the present disclosure are not so limited, and may be used to archive any form of digital files including audio files, video files, still images, or documents. For example, a presentation document may be reduced in size and metadata or other features (e.g., optically recognized characters) may be stripped therefrom where the business value score of the presentation is reduced.

Furthermore, although some of the embodiments disclosed herein describe digital media files having business value scores that are systematically reduced on a linear basis, such as the plot 600A of FIG. 6A, the systems and methods of the present disclosure are not so limited. Rather, business values may be increased or decreased according to any function or to any extent, and in any manner. Likewise, the number of business value score thresholds, or actions that may be taken when a business value score crosses such thresholds, are likewise not limited in accordance with the present disclosure, which is also not limited to any one form, means or method for digital media file compression.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3 or 5, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method comprising:
   capturing digital media files using at least one of a plurality of digital cameras;
   storing the digital media files in at least one data store;
   identifying a record of activity in a vicinity of the at least one of the plurality of digital cameras during the capturing of the digital media files;
   calculating, for each of the digital media files, a business value score corresponding based at least in part on the record of activity;
   determining, for at least one of the business value scores, whether the at least one of the business value scores is less than a first predetermined threshold at a first time; and
   in response to determining that the at least one of the business value scores is less than the first predetermined threshold at the first time,
   compressing the digital media file corresponding to the at least one of the business value scores.

2. The method of claim 1, wherein compressing the digital media file corresponding to the at least one of the business value scores comprises:

modifying the digital media file corresponding to the at least one of the business value scores using at least one codec.

3. The method of claim 1, further comprising:
determining, for the at least one of the business value scores, whether the at least one of the business value scores is less than a second predetermined threshold at a second time; and
in response to determining that the at least one of the business value scores is less than the second predetermined threshold at the second time,
transferring the digital media file corresponding to the at least one of the business value scores to a media storage facility over a network.

4. The method of claim 1, further comprising:
determining, for the at least one of the business value scores, whether the at least one of the business value scores is less than a third predetermined threshold at a third time; and
in response to determining that the at least one of the business value scores is less than the third predetermined threshold at the third time,
deleting the digital media file corresponding to the at least one of the business value scores from the at least one data store.

5. A method comprising:
capturing at least one digital media file using at least one imaging device;
identifying a record of activity occurring within at least a vicinity of the at least one imaging device;
correlating the record of activity with the at least one digital media file;
determining information regarding contents of at least one video frame of the digital media file;
generating a quantitative score indicative of a value of the at least one digital media file based at least in part on the information regarding the contents of the at least one video frame of the digital media file; and
maintaining the at least one digital media file in at least one data store based at least in part on the quantitative score.

6. The method of claim 5, wherein determining the information regarding the contents of the at least one video frame of the digital media file comprises:
analyzing the at least one digital media file to recognize at least one object expressed within the at least one video frame of the digital media file.

7. The method of claim 5, wherein generating the quantitative score indicative of the value of the at least one digital media file based at least in part on the information regarding the contents of the at least one video frame of the digital one video frame of the digital media file comprises:
defining the quantitative score according to a function.

8. The method of claim 7, wherein the quantitative score is defined based at least in part on one of:
a cost of compressing the at least one digital media file by a predetermined extent;
a cost of transferring the at least one digital media file to a media storage facility; or
a cost of deleting the at least one digital media file from the at least one data store.

9. The method of claim 7, wherein the method further comprises:
reducing the quantitative score according to the function;
determining whether the quantitative score is less than a first predetermined threshold; and in response to determining that the quantitative score is less than the first predetermined threshold,
modifying the digital media file based at least in part on the quantitative score.

10. The method of claim 9, wherein modifying the digital media file based at least in part on the quantitative score comprises at least one of:
reducing a level of resolution of the digital media file;
compressing the digital media file using at least one codec; or
deleting at least one video frame from the digital media file.

11. The method of claim 9, wherein the method further comprises:
determining whether the quantitative score is less than a second predetermined threshold; and
in response to determining that the quantitative score is less than the second predetermined threshold,
transmitting the digital media file to at least one media storage facility over a network.

12. The method of claim 9, wherein the method further comprises:
determining whether the quantitative score is less than a second predetermined threshold; and
in response to determining that the quantitative score is less than the second predetermined threshold,
deleting the digital media file from the at least one data store.

13. The method of claim 5, wherein the information regarding the contents of the at least one video frame of the digital media file identifies an event captured within the digital media file, and
wherein generating the quantitative score indicative of the value of the at least one digital media file based at least in part on the information regarding the contents of the at least one video frame of the digital media file comprises:
establishing a first value of the quantitative score based at least in part on information regarding the event.

14. The method of claim 13, further comprising:
determining a resolution associated with the event; and
establishing a second value of the quantitative score based at least in part on the resolution.

15. A monitored facility comprising:
a plurality of imaging devices; and
a computing device having at least one data store,
wherein the computing device is in communication with at least one of the plurality of imaging devices, and
wherein the computing device is configured to at least:
cause a digital media file to be captured by each of the plurality of imaging devices;
identify a record of events occurring within the monitored facility at a given time;
assign a first value score to a first digital media file captured by a first imaging device based at least in part on the record of the events, wherein the first imaging device is one of the plurality of imaging devices; and
store the first digital media file in the at least one data store according to the first value score.

16. The monitored facility of claim 15, wherein the computing device is further configured to at least:
define a function for adjusting the first value score based at least in part on the record of events;
determine whether the first value score satisfies a first threshold at a first time; and in response to determining that the first value score satisfies the first threshold at the first time,
modify the first digital media file based at least in part on the first value score at the first time.

17. The monitored facility of claim 15, wherein the computing device is further configured to at least:
compress the first digital media file based at least in part on the first value score;
transfer the first digital media file to a media storage facility over a network based at least in part on the first value score; or
delete the first digital media file from the at least one data store based at least in part on the first value score.

18. The monitored facility of claim 15, wherein the computing device is further configured to at least:
assign a second value score to a second digital media file captured by a second imaging device based at least in part on the record of the events; and
store the second digital media file in the at least one data store according to the second value score.

19. The monitored facility of claim 15, further comprising at least one of a fulfillment center, a financial institution or a transportation station,
wherein at least one of the plurality of imaging devices is installed within the at least one of the fulfillment center, the financial institution or the transportation station.

* * * * *

UNITED STATES PATENT AND TRADEMARK OFFICE
CERTIFICATE OF CORRECTION

| | |
|---|---|
| PATENT NO. | : 9,565,401 B1 |
| APPLICATION NO. | : 14/219069 |
| DATED | : February 7, 2017 |
| INVENTOR(S) | : Jules Cook Graybill and James Christopher Curlander |

It is certified that error appears in the above-identified patent and that said Letters Patent is hereby corrected as shown below:

In the Claims

Column 19:
Line 52 and 53, Claim 7, "the contents of the at least one video frame of the digital one video frame of the digital media file comprises:" should read as --the contents of the at least one video frame of the digital media file comprises:--

Signed and Sealed this
Sixteenth Day of August, 2022

Katherine Kelly Vidal
*Director of the United States Patent and Trademark Office*